United States Patent [19]

Shimizu et al.

[11] Patent Number: 4,656,737

[45] Date of Patent: Apr. 14, 1987

[54] FILM LOADING APPARATUS

[75] Inventors: Shigehisa Shimizu; Chiaki Suzuki; Kazumasa Harada; Tomohisa Maeda, all of Kanagawa, Japan

[73] Assignee: Fuji Photo Film Co., Ltd., Kanagawa, Japan

[21] Appl. No.: 855,262

[22] Filed: Apr. 24, 1986

Related U.S. Application Data

[62] Division of Ser. No. 576,649, Feb. 3, 1984, Pat. No. 4,614,019.

[30] Foreign Application Priority Data

Feb. 3, 1983 [JP] Japan ............................ 58-16640/83

[51] Int. Cl.$^{4}$ .............................................. B23P 19/00

[52] U.S. Cl. ...................................................... 29/806

[58] Field of Search .................................. 29/450, 806

[56] References Cited

U.S. PATENT DOCUMENTS 4,115,913 9/1978 Moriya et al. ......................... 29/806

4,614,019 9/1986 Shimuzu et al. ....................... 29/450

FOREIGN PATENT DOCUMENTS 1233214 7/1972 United Kingdom .................. 29/806

*Primary Examiner*—Howard N. Goldberg

*Assistant Examiner*—Steven Nichols

*Attorney, Agent, or Firm*—Sughrue, Mion, Zinn, Macpeak & Seas

[57] ABSTRACT

A method and apparatus for loading film into film cartridges having an improved throughput rate. Caps, spools and shell plates are supplied simultaneously with the winding of film. Film is wound onto spools while the spools are held. Shell plates are held with a shell plate chuck in such a manner that the shell plate is half open. Spools on which film has been wound are inserted into corresponding half-open shall plates, after which the shell plates are shaped as required. Caps are then fitted onto both open ends of the shell plate.

3 Claims, 5 Drawing Figures

FILM LOADING APPARATUS

This is a division of application Ser. No. 576,649, filed Feb. 3, 1984, now U.S. Pat. No. 4,614,019.

BACKGROUND OF THE INVENTION

The present invention relates to a method for loading 35 mm photographic roll film into a film cartridge, and to an apparatus for practicing such a method. More specifically, the invention relates to such a method and apparatus in which, while the caps, spool and shell plate (which are the essential components of a film cartridge) are supplied to form a film cartridge, film is simultaneously loaded into the same film cartridge.

An example of a conventional method for loading a film in a cartridge is a film intermittent loading method employing a turntable system used in a film loading apparatus such as that disclosed in U.S. Pat. No. 2,940,232. In accordance with that method, a turntable rotating intermittently is used. A station for supplying the spool, caps and shell plate, a film winding station for winding film on a spool, and a capping station for inserting the spool on which the film has been wound into the cylindrical structure formed by the shell plate and fitting the caps on both ends of the cylinder are provided above the turntable. The work is stopped at each station temporarily so that the above-described manufacturing operations can be carried out.

In accordance with this method, the period of time for which the turntable is stopped at each station during the assembly of film cartridges is fixed. Accordingly, the total assembly time per cartridge is fixed. Therefore, it is difficult to increase the speed of rotation of the turntable. Thus, it is difficult to manufacture film cartridges on a large scale at a high speed using the conventional method.

U.S. Pat. No. 3,586,258 discloses a device in which photographic film is inserted into an assembled film cartridge through a slot in the cartridge and wound onto the spool of the cartridge. In practicing this method, the winding time limits the assembly operation, and accordingly it is impossible to increase the manufacturing rate. In addition, insertion of the film into the film cartridge longitudinally through the slot in the cartridge requires a mechanism having a high positioning accuracy and is time consuming.

U.S. Pat. No. 4,115,913, filed by the present applicant, discloses a film loading method in which the caps, spool and shell plate are mounted on the same axis. While these components are being conveyed, the film is wound on the spool. Thereafter, the film cartridge is assembled. With this method, the film can be wound on the spool at a high speed, that is, it can be loaded into the cartridge at a high speed. Therefore, film cartridges can be produced on a large scale.

However, the method is nevertheless disadvantageous in the following points: Since the film is loaded while the above-described components are being conveyed, the film supplying system is intricate, and it is difficult to connect the film to the spool with a high reliability. Furthermore, the film winding and loading head must be capable of shaping the shell plate, supplying the caps, and transmitting power, in addition to its own function. Therefore, the apparatus is necessarily bulky and complex. In addition, the head conveying speed is limited, and accordingly the speed of winding and loading film is limited.

Accordingly, an object of the invention is to provide a film loading method in which the above-described difficulties accompanying a conventional film loading method have been eliminated, and the film can be wound and loaded into a cartridge at a high speed with a high reliability. It is also an object of the invention to provide an apparatus for practicing this method.

SUMMARY OF THE INVENTION

The foregoing objects of the invention have been achieved by the provision of a film loading method in which, according to the invention, caps, a spool and a shell plate, which are components of a film cartridge, are supplied individually, and the following steps are carried out in a parallel mode to load film into a film cartridge:

(a) winding film on the spool and holding the spool;
(b) holding the shell plate with a shell plate chuck in such a manner that the shell plate is half-open;
(c) inserting the spool on which the film has been wound into the half open shell plate;
(d) shaping the shell plate as required; and
(e) fitting the caps on the two open ends of the shell plate.

The objects of the invention are also met by an apparatus for practicing the above method.

DESCRIPTION OF THE PREFERRED EMBODIMENT

Preferred embodiments of the invention will be described in detail with reference to the accompanying drawings.

Figure 1:
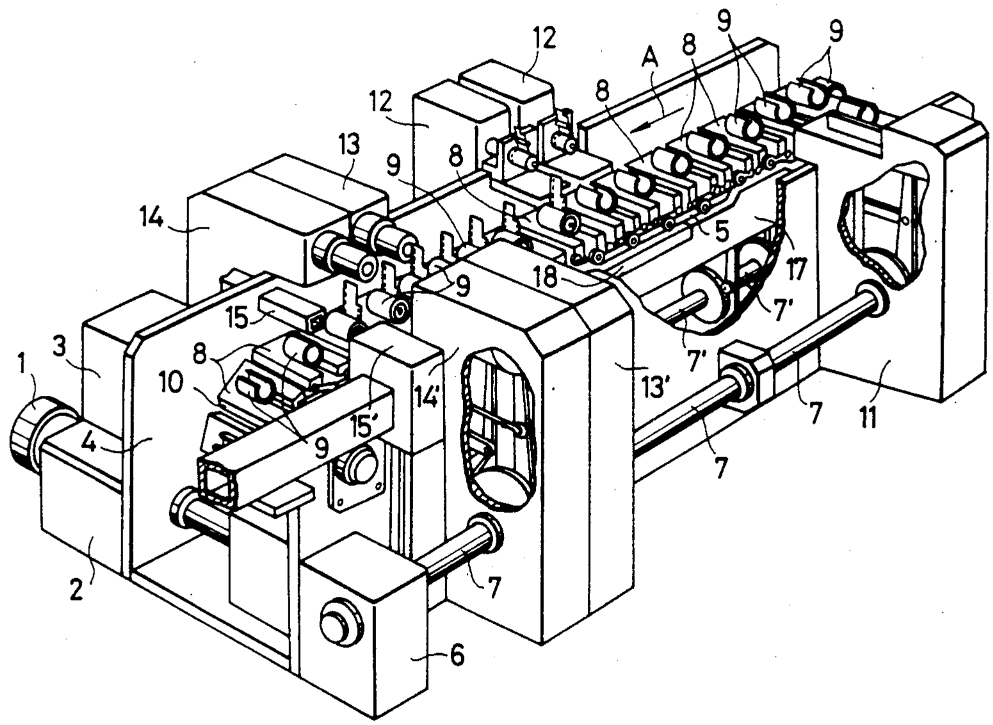
FIG. 1 is a perspective view of a preferred embodiment of a film winding apparatus according to the invention.

As shown in FIG. 1, a motor 1 is connected to a reduction gear 2. An index wheel (not shown) is intermittently rotated by an index 3 so that pallets 8 are intermittently conveyed by a chain 10. Shell plate chucks 9 are mounted on the pallets 8 and are opened and closed as the pallets 8 move. The output shaft of the reduction gear 2 transmits power directly or indirectly through a gear box 6 to drive shafts 7. While the pallets 8 are stopped, the drive shafts 7 and 7′ transmit power for supplying the temporarily shaped shell plates to the open shell plate chucks for inserting the spools on which the film has been wound into the half-open shell plates held by the chucks 9, and for pushing the caps into the chuck while it is closed to cause the shell plate to surround the spool on which the film has been wound. Caps, spools and shell plates, used to form film cartridges, are supplied individually to cap supplying stations 13 and 13′, winding stations 12 and a shell-plate temporary forming station 11 by means of conveyors and channels.

A shell plate is supplied, in the form of a flat plate, to the station 11, where it is made cylindrical. The resultant cylindrical shell plate is transferred from the station 11 to an open shell plate chuck 9. The chuck 9 holding the cylindrical shell plate is closed by a plate cam 17 as the pallet 8 is moved in the direction of the arrow A so that the shell plate is correctly set in the chuck. Thereafter, the chuck is made half-open and is then moved to the winding stations 12 where the shell plate receives the spool on which the film has been wound. Then, as a plate cam 18 rises, the chuck is closed to finally shape the shell plate. As the pallet 8 moves, the chuck 9, holding the thus-shaped shell plate including the spool with the film, is moved to the cap supplying stations 13 and 13' where it is supplied with caps from both sides. Thereafter, the caps are fitted on the two ends of the cylindrical shell plate at capping units 14 and 14'.

As is apparent from the above description, the film is loaded into the cartridges in a parallel mode. The cartridges loaded with film as described above are removed from the pallets 8 and the chucks 9 by cartridge removing units 15 and 15', and are then delivered to the next step.

In FIG. 1, reference characters 4 and 4' designate the frames of a film loading unit.

Figure 2:
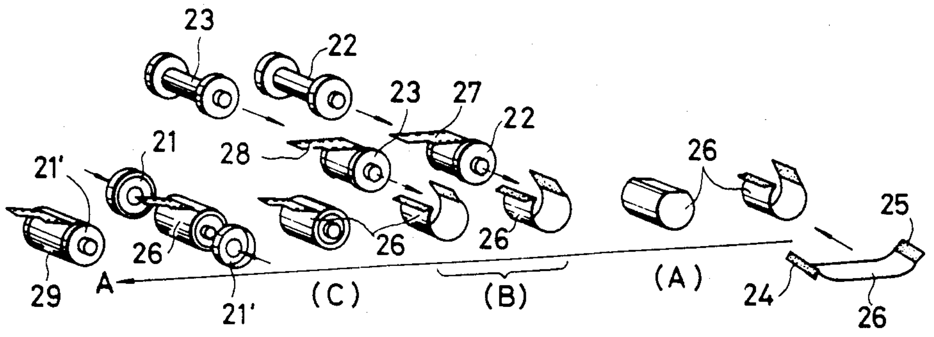
FIG. 2 is an explanatory diagram showing film cartridge manufacturing steps according to a film winding method of the invention.

As shown in FIG. 2, according to the method of the invention, the caps 21 and 21', the spools 22 and 23, and the shell plate 26 with pushes 24 and 25 are supplied individually, and the spools 22 and 23 are held on which film 27 and 28 has been wound. The shell plate 26 is made cylindrical at the shell-plate temporary shaping station 11 (FIG. 1). The shell plate 26 is then held by the shell plate chuck and is closed (at A in FIG. 2). Thereafter, the shell plate is made half-open (at B in FIG. 2). Under this condition, the spool 22 or 23 on which the film 27 or 28 has been wound is loaded into the half-open shell plate, and then the shell plate is finally shaped (at C in FIG. 2), thus forming a cylinder. The caps 21 and 21' are fitted on the two ends of the cylinder thus formed. Thus, a film cartridge has been manufactured.

The above-described operations are carried out in a parallel mode while the shell plates are moved intermittently in the direction of the arrow A. If the operation in which the film 27 or 28 is wound on the spool 22 or 23 and the spool 22 or 23 with the film 27 or 28 is loaded into the half-open shell plate 26 is carried out every time the pallet is moved intermittently, for instance, twice from the two stations, then operation can be achieved at a high speed because the winding work can be carried out irrespective of the speed of the manufacturing process.

Figure 3:
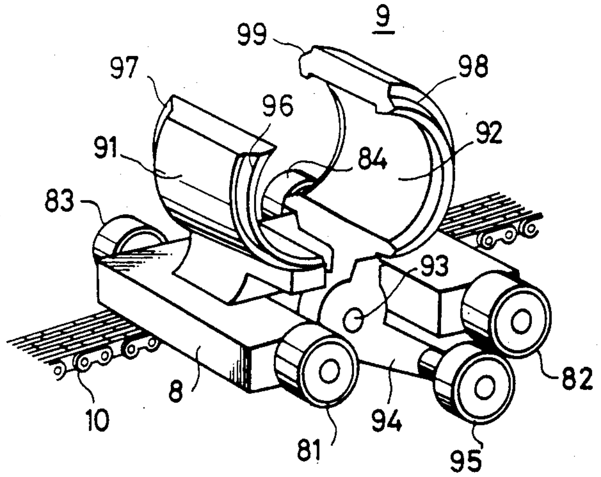
FIG. 3 is an enlarged perspective view showing a shell plate chuck.

As shown in FIG. 3, the shell plate chuck 9 is mounted on the intermittently moving pallet 8 held on the intermittently conveying chain 10. The chuck 9 is composed of a stationary chuck 91 and a movable chuck 92. The movable chuck 92 is swingably mounted on the pallet 8 through a shaft 93. The movable chuck 92 has a cam follower 95 connected to an opening and closing drive lever 94. As the pallet 8 is conveyed intermittently, the cam follower 95 is moved along the plate cams 17 and 18 so that the chuck is opened and closed as required. The stationary chuck 91 has ends 96 and 97, which are conically shaped and serve as guide surfaces. Similarly, the movable chuck 92 has ends 98 and 99, also conically shaped and serve as guide surfaces. These conically shaped ends contribute to the positioning of the caps when they are fitted on the ends of the cylinder formed by the shell plate. In FIG. 3, reference numerals 81, 82, 83 and 94 designate guide rollers. The guide rollers are moved along roller guides 5 secured to the frames 4 and 4' (FIG. 1) to convey the pallet in such a manner that the pallet is maintained at a fixed level.

Figure 4:
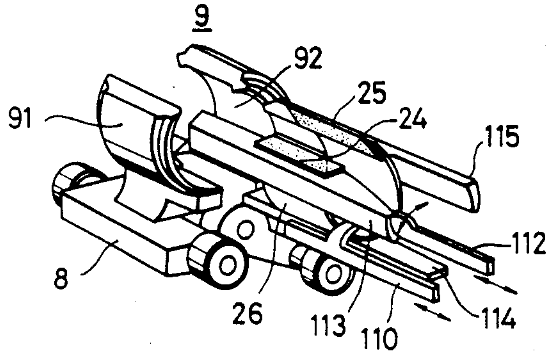
FIG. 4 is an explanatory diagram illustrating a method of inserting a temporarily formed shaped shell plate into the shell plate chuck.
Figure 5:
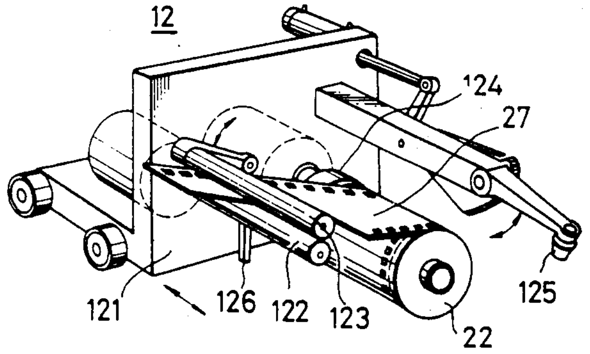
FIG. 5 is an explanatory diagram illustrating a method of winding film on a spool.

FIG. 4 illustrate in apparatus in which the temporarily shaped shell plate 26 is moved along guides 113, 114 and 115 into the chuck 9 by feed bars 110 and 112. FIG. 5 illustrates an apparatus in which the film 27 is wound on the spool 22 at the winding station 12. The spool 22 is held by supporting shafts 124 and 125. While the film 27 is being fed by the feed rolls 122 and 123, the supporting shaft 124 is rotated so that the film 27 is wound on the intermittently moving pallet 8 towards the half-open shell plate on the chuck 9 so that the spool 22 with the film 27 is inserted into the shell plate. At the same time, the supporting shaft 125 is released, and the supporting shaft 125, which is a suction type device, releases the suction pressure. Therefore, the spool 22 is released.

The shaping of the shell plate and the fitting of the caps can be achieved according to conventional manufacturing techniques and methods.

In the method of the invention, the spool on which the film has been wound is inserted into the half-open shell plate. Therefore, the manufacturing work is simple, and the manufacturing steps are carried out in a parallel mode. Accordingly, film cartridges can be manufactured at a considerably high speed.

The apparatus of the invention uses intermittently moving pallets along with shell plate chucks. With this arrangement, film cartridges can be manufactured with a high accuracy and with a high reliability. Furthermore, in accordance with the invention, winding stations including supply mechanisms are provided to wind the film on the spools and to supply them to the shell film chucks. This construction reduces the winding time and makes it possible to manufacture film cartridges in a parallel mode. In addition, the manufacturing facility and equipment can be made relatively small in scale.

While preferred embodiments of the invention have been described, it should be noted that the invention is not limited thereto or thereby. That is, it will be obvious to those skilled in the art that various changes and modifications can be made thereto without departing from the invention. For instance, more winding stations may be provided if necessary for increasing the manufacturing rate. The intermittently moving pallets may contain circular index tables. In the above-described embodiments, one of the components forming the shell plate chuck is stationary; however, the invention is not limited thereto.

We claim:

1. A film loading apparatus in which a film cartridge is formed by assembling caps, a spool and a shell plate supplied individually, comprising:

(a) a plurality of intermittently moving pallets, each having a shell plate chuck which is open for receiving said shell plate;

(b) means for making each said shell plate chuck half open and then closed while each said shell plate chuck is holding a shell plate;

(c) a plurality of winding stations, each comprising a mechanism which is movable towards each intermittently moving pallet, said mechanism comprising means for holding said spool, means for winding film on said spool thus held, and means for supplying said spool on which said film has been wound to said shell plate while said shell plate is half open; and (d) a capping unit.

2. The film loading apparatus of claim 1, wherein each said shell plate chuck comprises a semi-cylindrical stationary chuck and a semi-cylindrical movable chuck, said movable chuck being swingably mounted on its respective pallet, said movable chuck having a cam follower and an opening and closing drive lever connected to said cam follower.

3. The film loading apparatus of claim 2, wherein both said stationary chuck and said movable chuck have conically shaped ends serving as guide surfaces for said caps.

* * * * *